United States Patent [19]

Gagliani

[11] 4,299,787
[45] Nov. 10, 1981

[54] MELT SPINNING POLYIMIDE FIBERS

[75] Inventor: John Gagliani, San Diego, Calif.

[73] Assignee: International Harvester Company, Chicago, Ill.

[21] Appl. No.: 952,738

[22] Filed: Oct. 19, 1978

[51] Int. Cl.³ ............................................. B29D 27/00
[52] U.S. Cl. .................................. 264/41; 264/176 F; 264/236
[58] Field of Search ...................... 528/226, 229, 228; 264/51, 8, 176 F, 50, 140, 236, 41; 521/80, 185

[56] References Cited

U.S. PATENT DOCUMENTS

| | | | |
|---|---|---|---|
| 3,415,782 | 12/1968 | Irwin et al. | 528/226 |
| 3,420,795 | 1/1969 | Angelo | 528/226 |
| 3,494,823 | 2/1970 | Haller | 428/168 |
| 3,506,583 | 4/1970 | Boram et al. | 528/226 |
| 3,577,387 | 5/1971 | Kersten et al. | 528/226 |
| 3,726,834 | 4/1973 | Acle | 528/229 |
| 3,793,281 | 2/1974 | Acle | 264/51 |
| 3,832,330 | 8/1974 | Dixon et al. | 528/228 |
| 3,966,652 | 6/1976 | Gagliani et al. | 521/185 |
| 3,985,934 | 10/1976 | Farrissey et al. | 264/178 F |
| 4,070,312 | 1/1978 | Gagliani et al. | 528/229 |
| 4,094,862 | 6/1978 | Bell | 528/226 |

FOREIGN PATENT DOCUMENTS

| | | |
|---|---|---|
| 903271 | 8/1962 | United Kingdom . |
| 1038738 | 8/1966 | United Kingdom . |
| 1121325 | 7/1968 | United Kingdom . |
| 1188936 | 4/1970 | United Kingdom . |

*Primary Examiner*—Jay H. Woo
*Attorney, Agent, or Firm*—LeBlanc, Nolan, Shur & Nies

[57] ABSTRACT

Polyimide fibers which have a porous, microcellular structure. Methods of making such fibers from a precursor under conditions which cause the precursor to foam and undergo imidization.

4 Claims, 1 Drawing Figure

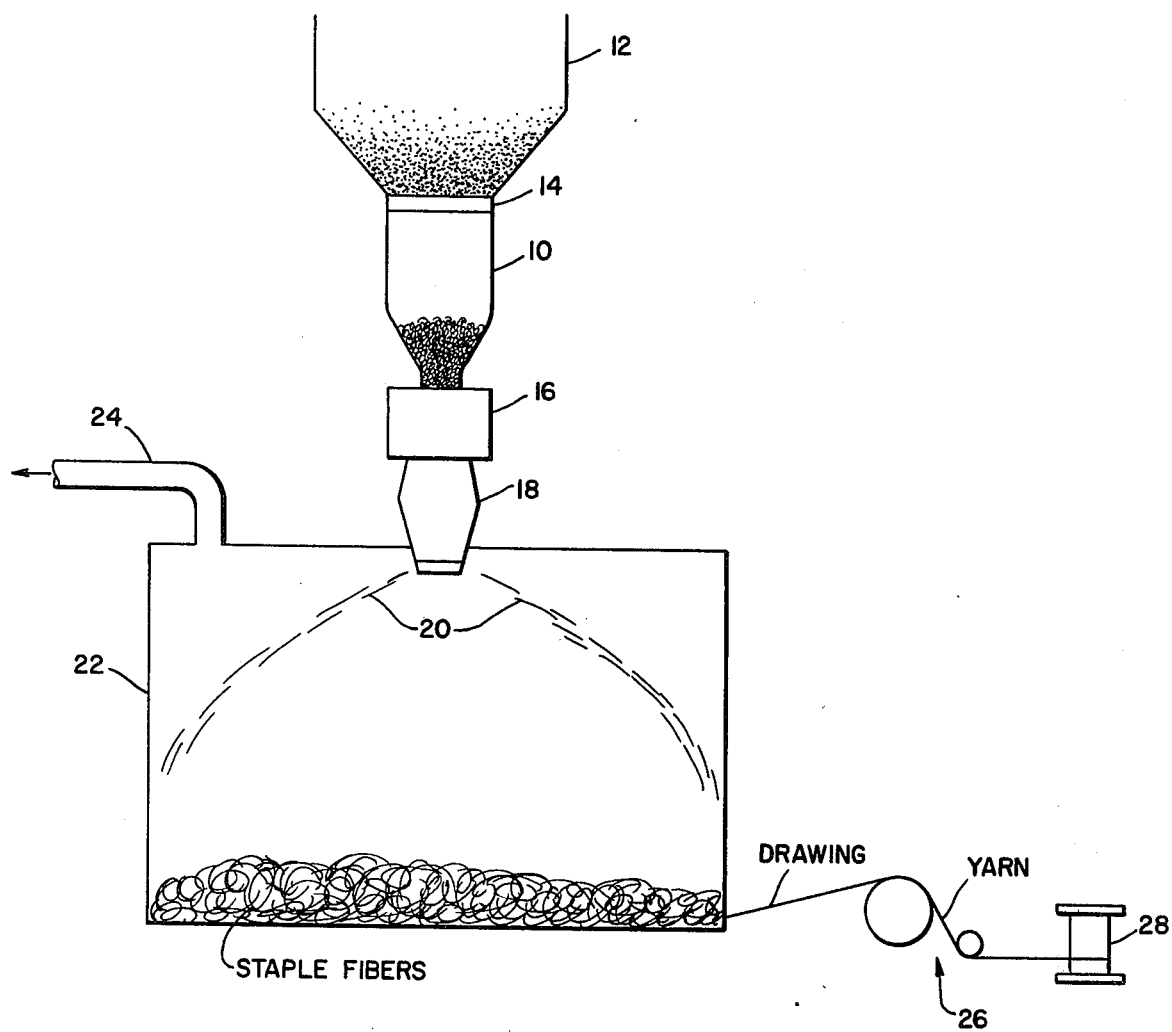

MELT SPINNING POLYIMIDE FIBERS

The present invention relates to synthetic fibers and, more particularly, to novel, improved methods for making polyimide fibers having a unique porous, microcellular structure.

Synthetic fibers are used in huge quantities in an almost unlimited variety of applications at this time.

One serious disadvantage of many presently available fibers, which is causing increasing concern and receiving increasing attention, is that they are flammable and, furthermore, tend to give off large quantities of smoke and toxic byproducts as they burn. This is particularly serious when the fibers and fabrics made from them are used in confined quarters such as those found in aircraft and spacecraft, for example.

It is known that, unlike many other synthetics, polyimides are highly fire resistant with improved versions of those materials being able to withstand temperatures as high as 650° F. (343° C.) or higher without significant oxidative degradation (see U.S. Pat. No. 3,966,652 issued June 29, 1976, to John V. Long et al for METHOD OF MAKING FOAMED COPOLYIMIDES AND PRODUCT OBTAINED THEREFROM, which is hereby incorporated by reference herein). Furthermore, those polyimides degrade into non-toxic compounds; and they do not give off smoke, both important advantages in applications where occupancy by humans or other animal life is concerned.

Because of their obvious advantages, efforts have heretofore been made to produce polyimide fibers. The process employed in those efforts involves spinning or extruding a filament from a solution of a polyamic acid precursor, then laying the filament on a moving surface and heating it to draw the filament and to remove the solvent and produce imidization of the polyamic acid precursor (see U.S. Pat. Nos. 3,415,782; 3,420,795; and 3,494,823; British Pat. Nos. 903,271; 1,038,738; 1,121,325; and 1,188,936; and Montcrief, MAN-MADE FIBERS, 6th Ed., pp. 692 and 693).

The technique just described is only useful on a very small scale.

I have now invented a novel, improved method for making polyimide fibers which, in contrast, is suitable for large scale, commercial production. Furthermore, the fibers produced by my novel process have a unique porous, microcellular structure.

In my novel process polyimide fibers are made by melting and foaming a particulate precursor and then forming it into fibers which are heated to a temperature in the range of 280°–315° C., optionally in an inert atmosphere, to effect imidization of the precursor.

The precursors I employ in the novel process just described are completely different from those heretofore used in making polyimide fibers in that they are essentially unreacted (or, preferably, incipiently polymerized), stoichiometric mixtures of aromatic and heterocyclic diamines and half esters of a benzophenonetetracarboxylic acid.

Those precursors have the unusual attribute of sharp melting points (100°–120° C.). Consequently, there is no problem in maintaining the precursor in the liquid state until the formation of the fibers is completed.

Another advantage of my novel process over that heretofore employed is that the precursors I use are solvent-free, essentially solid state solutions of the diamines and esters of which they are composed. Consequently, they are free of the disadvantages of the previously used polyamic acid solutions—the latter have a short shelf life; and they are complicated and expensive to produce and handle, susceptible to discoloration, etc.

At least one of the diamines I employ must be a heterocyclic diamine; and a second diamine is preferably an aromatic, meta or para-substituted diamine which contains no aliphatic moieties.

If diamines which do have aliphatic moieties are used, the resulting fiber will be significantly less structurally stable. Also, smoke will be produced if the fiber is heated above its thermal degradation temperature.

Mixtures of diamines must be employed so that there will be a random distribution of dissimilar, recurring units in the polymer chain.

Examples of suitable aromatic diamines are 3,3'-diamino diphenyl sulfone; 4,4'-diamino diphenyl sulfone; 4,4'-diamino diphenyl sulfide; 3,3'-diamino diphenyl ether; 4,4'-diamino diphenyl ether; meta-phenylene diamine; para-phenylene diamine; and mixtures of the foregoing.

The heterocyclic diamines I employ include 2,6-diamino pyridine and 3,5-diamino pyridine and mixtures thereof.

I can use from 95 parts by weight of heterocyclic diamine to 5 parts of aromatic diamine to 95 parts of aromatic diamine to 5 parts of heterocyclic diamine.

The ester component of the precursor is prepared by reacting the tetracarboxylic acid or its anhydride with one or more aliphatic alcohols at up to reflux temperature to esterify it.

The alcohols I use are those containing from 1 to 3 carbon atoms. Ethyl alcohol free of denaturants and additives is in many cases preferred.

Mixtures of $C_1$–$C_3$ esters can also be employed to advantage. These afford additional control over the foaming of the precursor as volatiles come off at different temperatures if mixed esters are used.

The mixture present after esterification is complete will typically be cooled before the diamines are added strictly as a safety measure. The diamines are then added and the mixture stirred, typically at reflux, until the diamines are dissolved.

Excess alcohol is removed from the resulting product at reduced pressure until it becomes a thick syrup. Optionally, at this point, a surfactant as described in U.S. Pat. No. 3,996,652 can be added in the amount and for the purposes described in that patent. Any excess solvent then remaining is removed by drying the viscous composition at a temperature in the range of ca. 76°–104° C., leaving an amphorous resinoid which is essentially a solid state solution of the ester and diamine constituents.

Preferably, the resinoid is pulverized into a powder and then further processed to reduce its volatiles content to a value which is one to five percent lower than the theoretical volatiles content of the resinoid (the theoretical volatiles content is the weight percent of alcohol and water in the benzophenonetetracarboxylic ester and diamine molecules released during the condensation polymerication reactions. It is these volatiles that foam the resinoid during the foaming process).

The volatiles content of the resin is lowered below the theoretical value to avoid the presence of free solvent as this tends to interfere with the foaming process. If the volatiles content is not reduced prior to foaming, volatilization may occur too fast in the foaming step, causing large voids and irregular cell structure.

The volatiles content of the precursor can be reduced to the desired level by heating it at a temperature of from 65° to 121° C. for a period of five minutes to 24 hours. After this step the resinoid is again pulverized.

The resulting resinoid powder has a long shelf life; it is free-flowing even after being stored for several months.

One preferred precursor of the character just described consists of the diethyl ester of 3,3',4,4'-benzophenonetetracarboxylic acid, 2,6 diamino pyridine, and 4,4'-diamino diphenyl sulfone in a ratio of 1.0:0.5:0.5 moles with 2.4 percent by weight of Union Carbide L-5430 surfactant and a reduced volatiles content obtained by heating the foregoing mixture at 200° F. for six hours after the removal of the excess solvent.

From the foregoing it will be apparent to the reader that one important and primary object of my invention resides in the provision of novel, improved, polyimide fibers.

A related, important, and also primary object of my invention resides in the provision of polyimide fibers which have a novel expanded, microcellular structure.

Other important but more specific objects of my invention reside in the provision of novel, improved methods for making polyimide fibers:

which produce fibers having an expanded, microcellular structure;

in which the precursor is, essentially, a solvent-free, solid state solution having a sharp melting point and composed of aromatic and heterocyclic diamines and half esters of a benzophenonetetracarboxylic acid;

which, in conjunction with the preceding object, employ precursors that contain a diester of a benzophenonetetracarboxylic acid and at least two diamines present in an amount such that the imide forming functionalities are substantially equimolar, one of said diamines being heterocyclic and having nitrogen in the ring, another of said diamines being a para- or meta-substituted aromatic diamine which is free of aliphatic moieties, and any additional diamine being either a heterocyclic or an aromatic diamine as aforesaid.

Other important objects and advantages and additional features of the present invention will be apparent to the reader from the appended claims and as the description and discussion of that invention proceeds in conjunction with the accompanying drawing in which the single FIGURE is a generally schematic illustration of apparatus for making polyimide fibers in accord with the principles of the present invention.

That apparatus includes a foaming chamber 10 into which the particulate polyimide precursor is fed as from a hopper 12 by a metering pump 14. Chamber 10 is maintained at a temperature in the range of 100°–200° C. by a conventional heater (not shown).

An inert atmosphere is preferably maintained in chamber 10. This can be accomplished by, for example, effecting a flow of an inert gas such as nitrogen or argon through the chamber.

The precursor begins to melt and foam in chamber 10, producing a semi-molten mass which is transferred by a second pump 16 to a conventional spinning disk 18 (or, optionally, a perforated disk extruder) which forms the melt into fibers 20. The latter are discharged into a polymerization chamber 22 heated, again conventionally, to a temperature in the range of 280°–315° F. to complete the polymerization reactions. An inert atmosphere may also be maintained in this chamber by exhausting air and volatiles through outlet 24.

The fibers are then drawn and processed conventionally with apparatus identified generally by reference character 26 and wound onto a spindle 28 to complete the process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of producing a polyimide fiber having an expanded microcellular structure, said method comprising the steps of: melting and foaming a fusible copolyimide precursor comprising at least one diester of a benzophenonetetracarboxylic acid and at least two diamines; the ester or esters and the diamines being present in an amount such that the imide forming functionalities are substantially equimolar, one of said diamines being heterocyclic and having nitrogen in the ring, another of said diamines being a para- or meta-substituted aromatic diamine which is free of aliphatic moieties, any additional diamine being either a heterocyclic or an aromatic diamine as aforesaid, and the melting and foaming of the precursor being effected by heating it to a temperature in the range of 100°–200° C.; then forming fibers from the molten material thus obtained; and heating said fibers to a temperature in the range of 280°–315° C. to complete the condensation polymerization reactions and thereby develop a polymer characterized by an aromatic copolyimide structure.

2. A method as defined in claim 1 in which the melting and foaming of the precursor and the subsequent completion of the condensation polymerization reactions are carried out in an inert atmosphere.

3. A method as defined in claim 1 in which the amines are selected from the group consisting of 3,3'-diamino diphenyl sulfone; 4,4'-diamino diphenyl sulfone; 4,4'-diamino diphenyl sulfide; 3,3'-diamino diphenyl ether; 4,4'-diamino diphenyl ether; meta-phenylene diamine; para-phenylene diamine; 2,6-diamino pyridine; and 3,5-diamino pyridine and heterocyclic and aromatic diamines are present in a ratio of from 5–95 parts by weight of heterocyclic diamine or diamines to 95–5 parts of aromatic diamine or diamines.

4. A method as defined in claim 1 in which the, or every, diester is a $C_1$–$C_3$ diester of 3,3',4,4'-benzophenonetetracarboxylic acid or a mixture of such esters.

* * * * *